No. 743,275. PATENTED NOV. 3, 1903.
H. HALSEY.
ELECTRIC BATTERY.
APPLICATION FILED JUNE 23, 1903.
NO MODEL.
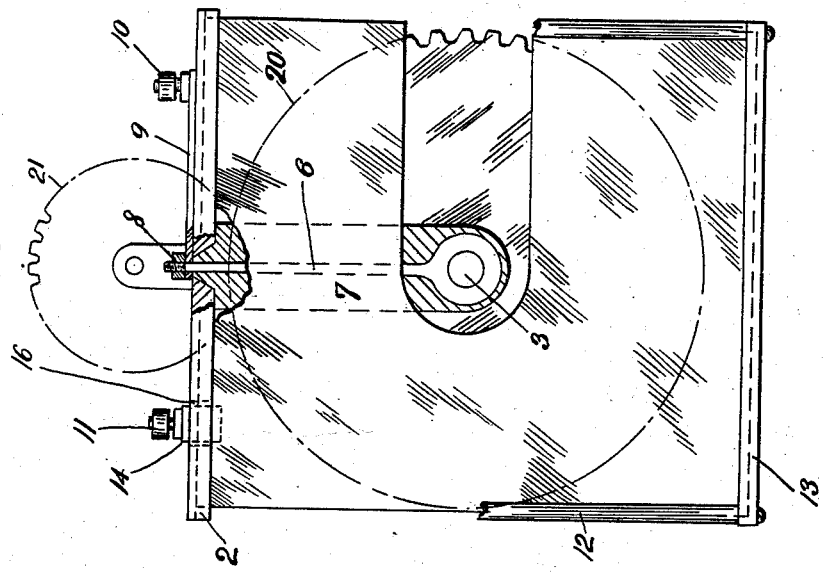
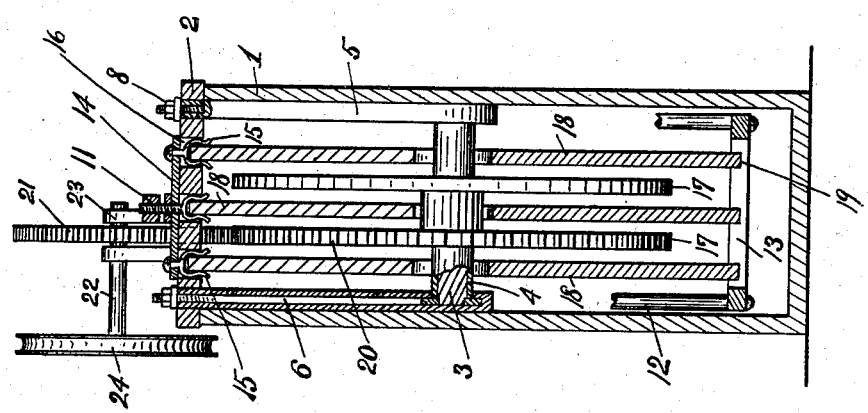
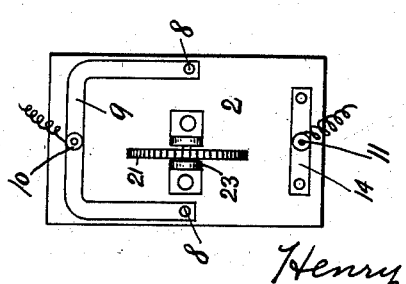
WITNESSES:
George H. Kerr
Anthony J. Ernest
INVENTOR
Henry Halsey
BY
C. V. Edwards
ATTORNEY
THE NORRIS PETERS CO., PHOTO-LITHO., WASHINGTON, D. C.

No. 743,275. Patented November 3, 1903.

UNITED STATES PATENT OFFICE.

HENRY HALSEY, OF NEW YORK, N. Y., ASSIGNOR TO HALSEY ELECTRIC GENERATOR COMPANY, A CORPORATION OF NEW JERSEY.

ELECTRIC BATTERY.

SPECIFICATION forming part of Letters Patent No. 743,275, dated November 3, 1903.

Application filed June 23, 1903. Serial No. 162,696. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to electric batteries; and its object is to provide a simple and compact type of power-battery which shall be of high efficiency and may be readily assembled and manipulated.

In the present battery the electrodes are suspended from a cover, so as to be removable from the electrolyte when the battery is not in use, and are so arranged as to be entirely immersed when the cover is in position. The movable electrode is mounted in hangers attached to the under side of the cover, which latter carries a suitable driving mechanism. The current may be collected by conductors embedded in the hangers contacting with the electrode and suitably insulated from the electrolyte, so as not to be attacked thereby, or the current may be collected by a brush, as described in my copending application, Serial No. 138,447, filed January 8, 1903. I have chosen to illustrate herein a construction by which the current can be taken out through the hangers, though I do not wish to be restricted to that manner of collecting the current. The movable electrode is preferably composed of a number of parallel disks mounted on a shaft, and the fixed electrode preferably comprises a number of independent plates electrically connected to a binding-post on the cover. As the positive electrode frequently needs renewal, it is important to devise some way of mounting it, so that this can be readily accomplished without disturbing the other parts of the battery. In the construction I am about to describe the several plates of the positive electrode may be easily and quickly changed when desired.

The invention will be more particularly described with reference to the form thereof shown in the accompanying drawings, in which—

Figure 1 is an end view, partly in section, of my new battery. Fig. 2 is a side view showing the cover carrying the electrodes detached. Fig. 3 is a reduced plan view of the cover, showing the electrical connections.

1 is a casing or receptacle adapted to contain the electrolyte and having a cover 2.

3 is a shaft having insulation 4, carried in the hangers 5, which are dovetailed into the cover, as shown in Fig. 2. Each hanger comprises a metallic rod 6, surrounded by insulation 7 and having a bearing-ring at its lower end in which the shaft 3 rotates. The rods 6 are threaded at their upper ends and have nuts 8 for attaching them to the cover. The hangers are connected by a metallic plate 9, which carries a binding-post 10. (See Fig. 3.)

The positive electrode is composed of a number of plates 18, which are supported in a frame 13, carried by rods 12, depending from the cover. The plates 18 are retained at the lower ends by grooves 19 in frame 13 and at their upper ends are supported by the spring-clips 15 in slots 16 in the cover, the clips 15 being carried by plates 14, which also carry a binding-post 11. The under side of the cover is suitably grooved to permit the plates 15 to slide into position. The cut-away portion 25 in the plates 15 permits the plates to clear shaft 4 in sliding into and out of position.

A suitable gear 20 is provided upon one of the disks of the movable electrode, and this gear meshes with a pinion 21, carried by shaft 22, which is mounted in suitable bearings on the cover and may be driven by any convenient means through the medium of pulley 24.

Any suitable material may be used for the rods 6 and the shaft 4; but I have found Tobin bronze to be well adapted for the purpose, as it has a high conductivity and will not be readily attacked by the electrolyte should the insulation wear off.

It will be understood that the parts above described may be modified and arranged to meet individual conditions, and I therefore desire it to be understood that I do not herein limit myself to the specific construction shown and described.

Having thus described my invention, I declare that what I claim as new, and desire to secure by Letters Patent, is—

1. In a battery, the combination with a casing, of a cover carrying both electrodes, one being movable and carried in depending hangers, substantially as described.

2. In a battery, the combination with a casing, of a cover carrying both electrodes, one being movable and carried in depending hangers, and means for collecting the current from said movable electrodes through the hangers, substantially as described.

3. In a battery, the combination with a casing, of a cover carrying both electrodes, one being movable and carried in depending hangers of conducting material, substantially as described.

4. In a battery, the combination with a casing, and a fixed electrode, of a cover carrying depending hangers, and a movable electrode supported by said hangers, substantially as described.

5. In a battery, a cover, a fixed electrode, a movable electrode carried in hangers, and means for collecting current through the hangers, substantially as described.

6. In a battery, the combination of a movable electrode supported in hangers, with a fixed electrode supported in a frame, substantially as described.

7. In a battery, a casing, a cover, hangers depending therefrom carrying a movable electrode, said hangers being composed of conducting material, a plate connecting said hangers, and a fixed electrode, substantially as described.

8. In a battery, the combination of a movable electrode supported in hangers, with a fixed electrode supported in a frame, said parts being carried by a cover, substantially as described.

9. In a battery, a cover, a fixed electrode removably supported thereby, a movable electrode carried in hangers, and means for collecting the current through the hangers, substantially as described.

10. In a battery, a cover, a fixed electrode removably supported thereby, a clip holding the electrode in place, said clip engaging with the cover, a movable electrode carried in hangers, and means for collecting the current through the hangers, substantially as described.

11. In a battery, the combination with the casing, of a cover, a pair of hangers carried thereby, said hangers being composed of insulating material, and bearings of conducting material embedded in said hangers and adapted to support a movable electrode, substantially as described.

12. In a battery, the combination with the casing, of a cover, a pair of hangers carried thereby, said hangers being composed of insulating material, bearings of conducting material carrying a movable electrode and turning in said bearings, and insulating material covering said shaft and coöperating with the insulating material of the hangers to protect said bearings, substantially as described.

13. In a battery, the combination with a casing and a top, of a movable electrode carried in hangers depending from the top, a fixed electrode comprising one or more plates having cut-out portions adapted to permit the movable electrode to be entirely immersed, and means for collecting current from said electrodes, substantially as described.

14. In a battery, the combination with a casing and a top, of a movable electrode carried in hangers depending from the top, a fixed electrode comprising one or more plates having cut-out portions adapted to permit the movable electrode to be entirely immersed, and means on the top for collecting the current from said electrodes, substantially as described.

15. In a battery, the combination with a casing and a top, of a movable electrode carried in hangers depending from the top, a gear-wheel mounted on the top and driving said movable electrode, a fixed electrode comprising one or more plates having cut-out portions to permit the movable electrode to be entirely immersed, and means for collecting the current from said electrodes, substantially as described.

In testimony whereof I affix my signature in presence of two witnesses.

HENRY HALSEY.

Witnesses:
ANTHONY J. ERNEST,
GEORGE N. KERR.